(12) United States Patent
Bilodeau (10) Patent No.: US 7,745,007 B2
(45) Date of Patent: Jun. 29, 2010

(54) RELEASE SHEETS AND METHODS OF MAKING THE SAME

(75) Inventor: Wayne L. Bilodeau, Gorham, ME (US)

(73) Assignee: S.D. Warren Company, Boston, MA (US)

( * ) Notice: Subject to any disclaimer, the term of this patent is extended or adjusted under 35 U.S.C. 154(b) by 492 days.

(21) Appl. No.: 11/590,218

(22) Filed: Oct. 31, 2006

(65) Prior Publication Data

US 2008/0102271 A1   May 1, 2008

(51) Int. Cl.
*B32B 27/00* (2006.01)
*B32B 27/30* (2006.01)

(52) U.S. Cl. .................... 428/424.4; 428/522

(58) Field of Classification Search ............... 428/500, 428/424.2, 424.4, 522
See application file for complete search history.

(56) References Cited

U.S. PATENT DOCUMENTS

| | | | |
|---|---|---|---|
| 4,289,821 A | 9/1981 | Gray, III et al. | |
| 5,945,489 A | 8/1999 | Moy et al. | |
| 6,025,410 A | 2/2000 | Moy et al. | |
| 6,355,343 B1 | 3/2002 | Glassock | |
| 6,355,345 B1 | 3/2002 | Furuya et al. | |
| 6,861,024 B2 | 3/2005 | Glassock | |

FOREIGN PATENT DOCUMENTS

WO   WO 2006/065369 A2   6/2006

OTHER PUBLICATIONS

PCT Notification of Transmittal of International Search Report and Written Opinion for corresponding International Application No. PCT/US2007/082085, dated Apr. 7, 2008.

*Primary Examiner*—Kevin R. Kruer
(74) *Attorney, Agent, or Firm*—Fish & Richardson P.C.

(57) ABSTRACT

Release sheets that can be used to manufacture artificial leather, paneling, and other products, as well as methods of making such release sheets are described. In general, the release sheets include a substrate and a release coating. The release coating is formed on the substrate by applying a crosslinkable material, such as an acrylic functional material, then crosslinking the material. An example of a release coating is the crosslinked reaction product of an acrylic functional material and a Michael donor. The release sheets have surfaces that can be replicated with high fidelity using a casting material, such as a urethane casting material.

6 Claims, 4 Drawing Sheets

RELEASE SHEETS AND METHODS OF MAKING THE SAME

TECHNICAL FIELD

This invention relates to release sheets, and to methods of making the same.

BACKGROUND

A number of processes exist in which a polymeric film or sheet material is formed on or against a release sheet, and then separated from the release sheet after cooling or curing. Curing the polymeric film or sheet material (when necessary) can be accomplished by heat, by peroxide catalyst, or by radiation (e.g., ultraviolet radiation or electron beam radiation). The release sheet provides a surface from which the set polymeric film or sheet material can be separated, and also imparts a desired surface finish to the set polymeric film or sheet material. For example, a desired textured surface can be provided on the polymeric film or sheet material by forming the polymeric film or sheet material on or against a release sheet having a textured surface that is a mirror image of the desired textured surface. One example of making a set polymeric film or sheet material includes providing a release sheet having a desired surface effect, such as high gloss or texturing, and then casting a reactive urethane resin onto the provided release sheet. Typically, the reactive urethane resin is formed by mixing one or more diisocyanates and one or more polyol components, along with any other additives such as crosslinkers and accelerators (if desired). Upon mixing, the components begin to react. After mixing, the reactive urethane resin is applied to the release sheet where it sets, forming the set polymeric film or sheet material.

Release sheets can be made by applying a coating of an electron beam radiation curable material to one surface of a web substrate; pressing the coated side of the substrate against a replicative surface having a desired surface effect; irradiating the coating with electron beam radiation to cure the coating; and stripping the substrate from the replicative surface with the cured coating adhered to the substrate. The replicative surface can be a metal roll with a pattern engraved in its surface if a textured release sheet surface is desired, or a highly polished surface having a low surface roughness, if a high gloss release sheet surface is desired.

SUMMARY

This invention relates to release sheets, e.g., that can be used to manufacture artificial leather, paneling and other products, and to methods of making the same. Generally, the release sheets include a substrate and a release coating. The release coating is formed on the substrate by crosslinking a material, such as an acrylic functional material. Preferably, the materials from which the release coating is formed do not crystallize. Many of the release sheets disclosed herein have surfaces that can be easily replicated with high fidelity using a casting material, such as a urethane casting material. Preferably, the release sheets exhibit low release forces when a set (e.g., crosslinked) polymeric material is stripped away from the release sheet.

In one aspect, the invention features release sheets that include a substrate and a coating extending from the substrate. The coating includes a crosslinked polymeric material that is a crosslinked reaction product of an acrylic functional material and a Michael donor.

The acrylic functional material can be or can include, e.g., a mono-functional acrylate, a di-functional acrylate, a tri-functional acrylate, a tetra-functional acrylate, a penta-functional acrylate, or mixtures of these mono-functional and/or multi-functional acrylates. The acrylic functional materials can be or can include monomeric, oligomeric and/or polymeric acrylates.

Generally, preferred acrylic functional materials are those that include one or more acrylates having a ring or a ring system, and/or one or more acrylates having a long alkyl chain.

Preferred acrylic functional materials include isodecyl acrylate, isodecyl methacrylate, cyclohexane dimethanol diacrylate, tris-(2-hydroxyethyl)isocyanurate triacrylate and trimethylolpropane triacrylate.

The Michael donor can be, e.g., a mono-functional donor, a di-functional donor, a tri-functional donor, a tetra-functional donor, a penta-functional donor, a hexa-functional donor, or mixtures of these mono-functional and/or multi-functional donors. The Michael donor can be or can include monomeric, oligomeric or polymeric moieties.

Preferred Michael donors include dodecyl acetoacetate and lauryl acetoacetate.

In preferred embodiments, the reaction product of the acrylic functional material and the Michael donor is soluble in a solvent and/or is not substantially crosslinked.

In another aspect, the invention features release sheets that include a substrate and a coating extending from the substrate. The coating includes a crosslinked polymeric material that is a crosslinked reaction product of an acrylic functional material and a Michael donor. The reaction product of the acrylic functional material and the Michael donor has a turbidity of less than 250 NTU, e.g., less than 100 NTU or less than 5 NTU, as measured using ASTM D5180.

In another aspect, the invention features release sheets that include a substrate and a coating extending from the substrate. The coating includes a crosslinked polymeric material that is a crosslinked reaction product of an acrylic functional material and a Michael donor. When a solvent-borne polyurethane material is cast upon the coating and set (e.g., crosslinked), it has a peel resistance from the release sheet of less than about 275 g/1.5 in, e.g., less than about 250, 225, 200, 150, or even less than about 100 g/1.5 in.

In another aspect, the invention features products that include any of the release sheets described herein and a cast sheet integral with the coating of the release sheet. For example, the cast sheet can be polyurethane, e.g., a crosslinked polyurethane or other polymeric material.

In another aspect, the invention features a material, e.g., artificial leather, paneling, or another product made from any of the release sheets described herein.

In another aspect, the invention features methods of making release sheets. The methods include applying a coating to an exterior surface of a substrate and crosslinking the applied coating. The coating can be or can include any of the reaction products of the acrylic functional material and Michael donor described herein.

In preferred embodiments, the methods further include pressing the coating against a replicative surface having a desired surface effect prior to crosslinking and stripping the substrate from the replicative surface with the crosslinked coating adhered to the substrate.

In preferred embodiments, crosslinking is accomplished using an ionizing radiation, such as a beam of electrons.

Aspects and/or embodiments can have one or more of the following advantages. Release sheets are provided that include coatings which are made from crosslinking compositions which do not crystallize, even after prolonged periods of time, e.g., weeks, months, or even years. The provided release sheets have a reduced tendency to become non-planar and curl. The release sheets can be relatively rigid. Many of the coatings are "internally lubricated" (e.g., hydrophobic) and may not require release agents, e.g., silicone release agents. Many of the provided reaction products of the acrylic functional material and the Michael donor or formulations including them can improve dispersability and compatibility of components of a coating. The pattern or finish of the replicative surface formed on the release sheet can be reproduced with high fidelity, e.g., greater than 95 percent, greater than 98 percent, greater than 99 percent, or even greater than 99.9 percent. The release sheets described herein have excellent release characteristics, allowing for the replication of very fine patterns, such as wood grain and leather grain patterns, without the release sheet becoming fouled by the casting material.

A Michael addition product P is a product of a reaction between an α,β-unsaturated carbonyl compound, referred to as a Michael acceptor A, and a compound that includes an "enolizable" hydrogen atom, referred to as a Michael donor D. Generally and schematically, product P, acceptor A and donor D are shown below. $R_1$, $R_2$, $R_3$ can each be independently, e.g., a hydrogen atom, a halogen, a nitrile group or a hydrocarbon group; $R_4$ can be, e.g., a hydrocarbon group or an oxygen-containing group, e.g., an alkoxy group such as methoxy group; $R_5$ can be, e.g., a hydrogen or a hydrocarbon group; $G_1$ and $G_2$ are each independently an electron-withdrawing group such as —$CO_2CH_3$, —$NO_2$, or —CN. An "enolizable hydrogen" is one having a pKa of between about 5 and about 34 (e.g., between about 15 and 30), as measured in dimethyl sulfoxide (DMSO).

When $R_4$ is an alkoxy group such as a methoxy group, the Michael acceptor A is referred to an acrylate (ACR). As an example of a Michael addition reaction, methyl acetoacetate 2 (a Michael donor) is deprotonated with 1,8-Diazabicyclo [5.4.0]undec-7-ene (DBU) to give the corresponding enolate anion (not shown), which adds to the β-carbon of the double bond of methyl acrylate 1, yielding (after protonation) dimethyl 2-acetylpentanedioate 3.

An acrylic group AC is of the form shown below. An "acrylic functional material" is one that includes one or more monomeric, oligomeric or polymeric moieties that include at least one acrylic group. The acrylic functional material can be a blend of monomeric, oligomeric or polymeric moieties. Examples of monomeric acrylic functional materials that are mono-functional (one acrylic group) are isodecyl methacrylate 4, methyl methacrylate 5 and ethyl-α-cyanoacrylate 6; an example of a monomeric acrylic functional material that is di-functional (two acrylic groups) is cyclohexane dimethanol diacrylate 8; examples of a monomeric acrylic functional materials that are tri-functional (three acrylic groups) are trimethylolpropane triacrylate 9 and tris-(2-hydroxyethyl) isocyanurate triacrylate 7.

-continued

An example of a polymeric acrylic functional material that is mono-functional is schematically represented by structure 10, in which P represents a polymeric chain. Acrylic functional materials that are tetra-functional, penta-functional, hexa-functional, hepta-functional and octa-functional are those that include 4, 5, 6, 7 and 8 acrylic groups per entity, respectively.

A Michael donor D can have 1, 2, 3, 4, 5, 6, 7, 8 or more enolizable hydrogen atoms. A Michael donor having one enolizable hydrogen atom is referred to as being mono-functional; a donor having two enolizable hydrogen atoms is referred to as di-functional; a donor having three enolizable hydrogen atoms is referred to as tri-functional; a donor having four enolizable hydrogen atoms is referred to as tetra-functional; and so on.

"Crosslinked" as used herein means a material that is not soluble in any solvent, or, alternatively, a material that will not flow under heat and pressure without substantially degrading the material.

All publications, patent applications, patents, and other references mentioned herein are incorporated by reference herein in their entirety.

Other aspects, features, and advantages will be apparent from the description and drawings, and from the claims.

DETAILED DESCRIPTION

Figure 1:
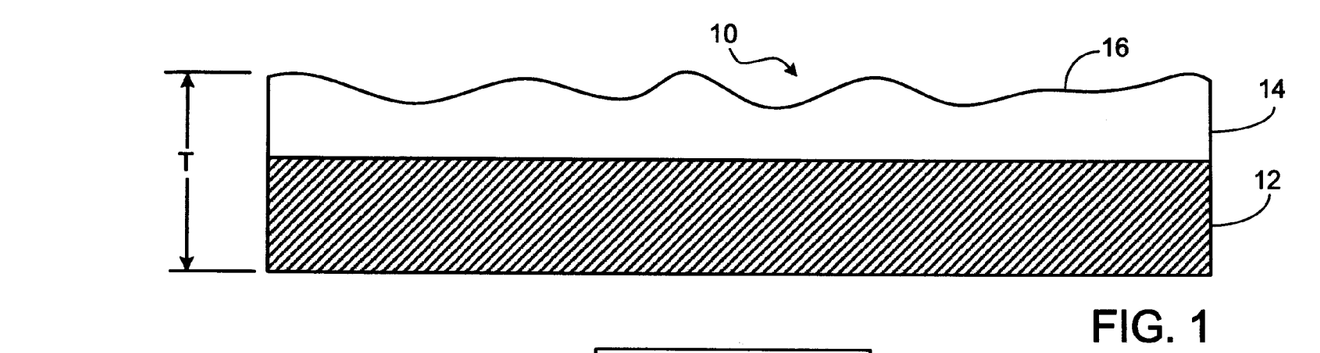
FIG. 1 is a longitudinal cross-sectional view of a portion of a release sheet, illustrating a substrate and a release coating having a textured surface.

Referring to FIG. 1, a release sheet 10 includes a substrate 12 and a release coating 14 extending from the substrate 12. The release coating 14 has a textured exterior surface 16 that can be replicated when cast upon by a casting material, e.g., a polyurethane casting material. Coating 14 includes a crosslinked polymeric material made from crosslinking a reaction product of an acrylic functional material and a Michael donor. For example, the acrylic functional material can be or can include one or more monomeric, oligomeric or polymeric moieties that include one or more acrylic groups. As shown schematically below, the acrylic functional material can be or can include one or more acrylates, $ACR_1$, $ACR_2$, $ACR_3$, $ACR_{n-3}$, ..., $ACR_n$. Reaction product M is formed by reacting the acrylic functional material, e.g., in the presence of a strong, hindered base, or a metal compound, with one or more Michael donors $D_1$, $D_2$, $D_3$, $D_{m-3}$, ..., $D_m$, such as methyl acetoacetate 2, ethyl acetoacetate, or dodecyl acetoacetate.

The reaction of the acrylic functional material and the Michael donor can be catalyzed by or effected by, e.g., strong, hindered (e.g., non-nucleophilic) bases, or by certain metal compounds. Examples of strong, hindered bases include potassium t-butoxide and DBU. Examples of certain metal compounds include rubidium salts of L-proline, cobalt and nickel diamines, cobalt and nickel carboxylates, rhodium (I) compounds such as rhodium (I) phosphines, and lanthanum, calcium, gallium and aluminum phenoxides.

The acrylic functional material can be or can include, e.g., a mono-functional acrylate, a di-functional acrylate, a tri-functional acrylate, a tetra-functional acrylate, a penta-functional acrylate, or mixtures of these. The acrylic functional materials can be or can include monomeric, oligiomeric and/or polymeric acrylates.

Examples of mono-functional acrylates include 2-(2-ethoxyethoxy)ethyl acrylate, 2-phenoxyethyl acrylate, 2-phenoxyethyl methacrylate, alkoxylated lauryl acrylate, alkoxylated phenol acrylate, alkoxylated tetrahydrofurfuryl acrylate, caprolactone acrylate, cyclic trimethylolpropane formal acrylate, dicyclopentadienyl methacrylate, diethylene glycol methyl ether methacrylate, ethoxylated hydroxyethyl methacrylate, ethoxylated hydroxyethyl methacrylate, ethoxylated nonyl phenol acrylate, ethoxylated nonyl phenol methacrylate, ethoxylated nonyl phenol acrylate, isobornyl acrylate, isobornyl methacrylate, isodecyl acrylate, isodecyl methacrylate, isooctyl acrylate, lauryl acrylate, lauryl methacrylate, methoxy polyethylene glycol monoacrylate, methoxy polyethylene glycol monomethacrylate, methoxy polyethylene glycol monoacrylate, octyldecyl acrylate, polypropylene glycol monomethacrylate, propoxylated allyl methacrylate, stearyl acrylate, stearyl methacrylate, tetrahydrofurfuryl acrylate, tetrahydrofurfuryl methacrylate, tridecyl acrylate and tridecyl methacrylate.

Preferred mono-functional acrylates include isodecyl acrylate or isodecyl methacrylate.

Examples of di-functional acrylates include 1,3-butylene glycol diacrylate, 1,3-butylene glycol dimethacrylate, 1,4-butanediol diacrylate, 1,4-butanediol dimethacrylate, 1,6-hexanediol diacrylate, 1,6-hexanediol dimethacrylate, alkoxylated aliphatic diacrylate, alkoxylated cyclohexane dimethanol diacrylate, alkoxylated hexanediol diacrylate, alkoxylated neopentyl glycol diacrylate, diethylene glycol diacrylate, dipropylene glycol diacrylate, ethoxylated bisphenol diacrylate, ethoxylated bisphenol A dimethacrylate, neopentyl glycol diacrylate, neopentyl glycol dimethacrylate, polyethylene glycol diacrylate, polyethylene glycol dimethacrylate, propoxylated neopentyl glycol diacrylate, tetraethylene glycol diacrylate, tetraethylene glycol dimethacrylate, tricyclodecane dimethanol diacrylate and cyclohexane dimethanol diacrylate.

A preferred di-functional acrylate is cyclohexane dimethanol diacrylate.

Examples of tri-functional acrylates include ethoxylated trimethylolpropane triacrylate, ethoxylated trimethylolpropane triacrylate, pentaerythritol triacrylate, propoxylated glyceryl triacrylate, trimethylolpropane triacrylate, tris-(2-hydroxyethyl)isocyanurate triacrylate.

Preferred tri-functional acrylates include tris-(2-hydroxyethyl)isocyanurate triacrylate and trimethylolpropane triacrylate Examples of tetra-functional acrylates include di-trimethylolpropane tetraacrylate, ethoxylated pentaerythritol tetraacrylate, pentaerythritol tetraacrylate and di-trimethylolpropane tetraacrylate.

Example of penta-functional acrylates include dipentaerythritol pentaacrylate and ethoxylated pentaerythritol pentaacrylate.

Generally, some preferred acrylic functional materials are those that include one or more acrylates having a ring or a ring system such as an aromatic or aliphatic ring system (e.g., a hydrophobic aliphatic ring system). Some particularly preferred acrylic functional materials are those that include acrylates that include a ring or a ring system which forces the acrylate or large portions of the acrylate to remain substantially in a single plane, as is the case with tris-(2-hydroxyethyl) isocyanurate triacrylate 7. Without wishing to be bound by any particular theory, it is believed that moieties that include ring systems can reduce release sheet curl, at least in part, due to their rigid molecular structures.

Other preferred acrylic functional materials are those that include acrylates that have long straight or branched hydrocarbon chains in their structure. For example, the hydrocarbon chains can include 7 carbon atoms, 8, 9, 10, 11, 12, 13, 14, 15, 16, 17, 18 carbon atoms, or more, e.g., 24 carbon atoms. Examples of such groups include heptyl, 5-methylhexyl, 1-methylhexyl, 2,2-dimethylpentyl, 3,3-dimethylpentyl, octyl, 6-methylheptyl, nonyl, methyloctyl, ethylheptyl, decyl, methyldecyl, dodecyl, and methylundecyl groups. Preferred long chain hydrocarbons include lauryl, dodecyl and isodecyl groups. Without wishing to be bound by any particular theory, it is believed that the long hydrocarbon chains can prevent crystallization because of their high entropy. In addition, the long alkyl chains can improve the non-stick properties of the formed coatings because of their hydrophobicity.

Some preferred acrylic functional materials are those that include both one or more acrylates having a ring or a ring system, and one or more acrylates that have long straight or branched hydrocarbon chains in their structure. In such embodiments, it is believed that the effects of each (as discussed above) can be synergistic and can form mixtures that do not crystallize. In addition, the long alkyl chains can improve the non-stick properties of the formed coatings because of their hydrophobicity.

The Michael donor can be or can include, e.g., a mono-functional donor, a di-functional donor, a tri-functional donor, a tetra-functional donor, a penta-functional donor, a hexa-functional donor, or mixtures of these. The Michael donor can be monomeric, oligiomeric or polymeric.

Examples of Michael donors that are di-functional include methyl acetoacetate, ethyl acetoacetate, t-butyl acetoacetate, 2-ethylhexyl acetoacetate, lauryl acetoacetate, acetoacetanilide, 2-acetoacetoxyethyl methacrylate, allyl acetoacetate, dodecyl acetoacetate and lauryl acetoacetate.

Preferred di-functional Michael donors include dodecyl acetoacetate and lauryl acetoacetate.

Examples of Michael donors that are tetra-functional include of butanediol diacetoacetate, 1,6-hexanediol diacetoacetate, neopentyl glycol diacetoacetate, cyclohexanedimethanol diacetoacetate and ethoxylated bisphenol A diacetoacetate.

An examples of a Michael donor that are hexa-functional include trimethylolpropane triacetoacetate, glycerin triacetoacetate and polycaprolactone triacetoacetate.

Generally, preferred Michael donors are those that include long straight or branched hydrocarbon chains in their structure. For example, the hydrocarbon chains can include 7 carbon atoms, 8, 9, 10, 11, 12, 13, 14, 15, 16, 17, 18 carbon atoms, or more, e.g., 24 carbon atoms. Without wishing to be bound by any particular theory, it is believed that the long hydrocarbon chains can prevent crystallization of the acrylic functional materials or products derived therefrom because of their high entropy. It is also believed that the long chains can, at least in some instances, improve the non-stick properties of the formed coatings because of the hydrophobicity of the long alkyl chains. In other words, the long alkyl chains act as a lubricant.

Additional acrylic functional materials and Michael donors can be found in Moy et al., U.S. Pat. Nos. 5,945,489 and 6,025,410.

In preferred embodiments, the reaction product M of the acrylic functional material and the Michael donor is soluble in a solvent and/or is not substantially crosslinked, at least from some time, such as 1 hour, 6 hours or 24 hours after its formation. Generally, to produce a soluble reaction product, the initial average functionality of the acrylic functional material to the initial average functionality of the Michael donor is maintained at a relatively high level, e.g., greater than 2/1, greater than 3/1, greater than 4/1, greater than 5/1, greater than 6/1, greater than 7/1, greater than 8/1, greater than 10/1 or even greater than 14/1. Maintaining soluble reaction products are discussed in Moy et al., U.S. Pat. Nos. 5,945,489 and 6,025,410.

Some of the reaction chemistry involved in producing the reaction product M of the acrylic functional material and the Michael donor is discussed in a little more detail below. For example, when the acrylic functional material is a mixture of tris-(2-hydroxyethyl)isocyanurate triacrylate 7 and isodecyl acrylate 4, and the Michael donor is methyl acetoacetate 2, the enolate ion (not shown) of methyl acetoacetate, e.g., formed by reaction of a strong base with methyl acetoacetate 2, can add into one of the double bonds of one of the acrylic groups, and then can be subsequently protonated to produce an addition product such as 11. Addition product 11 has an enolizable hydrogen atom, and so can be deprotonated to produce the corresponding enolate ion (not shown). The corresponding enolate ion can react, e.g., with isodecyl acrylate 4 to produce the corresponding addition product 12 (after protonation). The reaction scheme has been simplified in that typically all possible products are produced during the reactions, including "coupled products", e.g., mono-, di- and tri-coupled products of 7, along with oligomers and/or polymers.

An example of a mono-coupled product is 7', which is shown below. Since in most instances all possible products are be produced during the reactions, the reaction generally produces a low melting point ("eutectic") or non-crystallizing product.

7'

This eutectic effect can be enhanced by using a Michael donor that includes a long alkyl chain in its structure. For example, n-dodecyl acetoacetate 13 can be used in place of, or in addition to methyl acetoacetate 2 (above), producing an addition product, such as 15. Addition product 15 has an enolizable hydrogen atom, and so can be deprotonated, as discussed above. The corresponding enolate ion can react, e.g., with isodecyl acrylate 4 or 15 to produce corresponding addition products. This process continues, in most instances, to produce all possible products, as discussed above. In addition to providing low melting compositions, the long alkyl chains can provide coatings on substrates which are "internally lubricated" in that the coating itself is lubricious, and may not need a release agent.

7

+

-continued

In some embodiments, the reaction product M of the acrylic functional material and the Michael donor (after removal of any insoluble materials, e.g., salts) has a turbidity of less than 250 NTU, e.g., less than 200, less than 150, less than 100, less than 75, less than 50, less than 25 or even less than 5 NTU. Turbidity of the reaction product M is measured on the neat material at room temperature after the reaction product has aged for 1 month at room temperature under an inert atmosphere of nitrogen. Turbidity is measured according to ASTM D5180.

In some embodiments, the reaction product M of the acrylic functional material and the Michael donor is oligomeric. For example, it can have a number average molecular weight of less than about 10,000, e.g., between about 500 and about 9,500, between about 1,000 and about 8,500 or between about 1,000 and about 5,000, as determined using a universal calibration curve.

The reaction product M can be used by itself to coat a substrate, or in a formulation together with other materials. Other materials can include, e.g., other acrylates, release agents, photoinitiators, photoinitiator synergists, pigments, fillers, adhesion promoters, flattening agents, wetting agents, slip agents, stabilizers, viscosity control agents and surface texture-providing or promoting materials.

Examples of photoinitiators include 1-[-(4-benzoylphenylsulfanyl)phenyl]-2-methyl-2-(4-methylphenylsulfonyl) propan-1-one, 1-hydroxy-cyclohexyl-phenyl-ketone, 2,4,6-trimethylbenzoyldiphenylphosphine oxide, 2-ethylhexyl-4-dimethyl amino benzoate, 2-hydroxy-2-methyl-1-phenyl-1-propanone, benzil dimethyl ketal, benzophenone, blends of benzophenone and a-hydroxy-cyclohexyl-phenyl-ketone, ethyl-4-(dimethylamino)benzoate, isopropyl thioxanthone, 4-methylbenzophenone, oligo(2-hydroxy-2 methyl-1-4 (1-methylvinyl)phenyl propanone, oligo(2-hydroxy-2-methyl-1-4(1-methylvinyl)phenyl propanone and 2-hydroxy-2-methyl-1-phenyl-1-propanone. Photoinitiators are available from Sartomer Company.

Examples of release agents include reactive or nonreactive silicones, preferably an aminofunctional siloxane. The release agent is added to ensure release of the acrylic functional coating from the replicative surface which imparts the desired surface effect to the polymerized coating. Siloxanes are commercially available from Goldschmidt Chemical Corp., e.g., TEGO Glide ZG-400 and TG RC-704, from Dow Corning Corporation, e.g. 2-8577 Fluid, and from UCB Chemicals Corporation, e.g., Ebecryl 350.

In embodiments in which a formulation is used for the coating, the formulation typically contains between about 5 percent and about 75 percent by weight of the reaction product M, e.g., between about 10 percent and about 50 percent or between about 15 percent and 30 percent by weight of the reaction product.

In preferred embodiments, the reaction product M or a formulation that includes the reaction product has a viscosity of from about 250 cps to about 2,500 cps, e.g., from about 300 cps to about 1,500 cps or from about 400 cps to about 1,000 cps, as measured using a Brookfield RVF viscometer at 75° F. and 20 rpm (#4 spindle).

Figure 2:
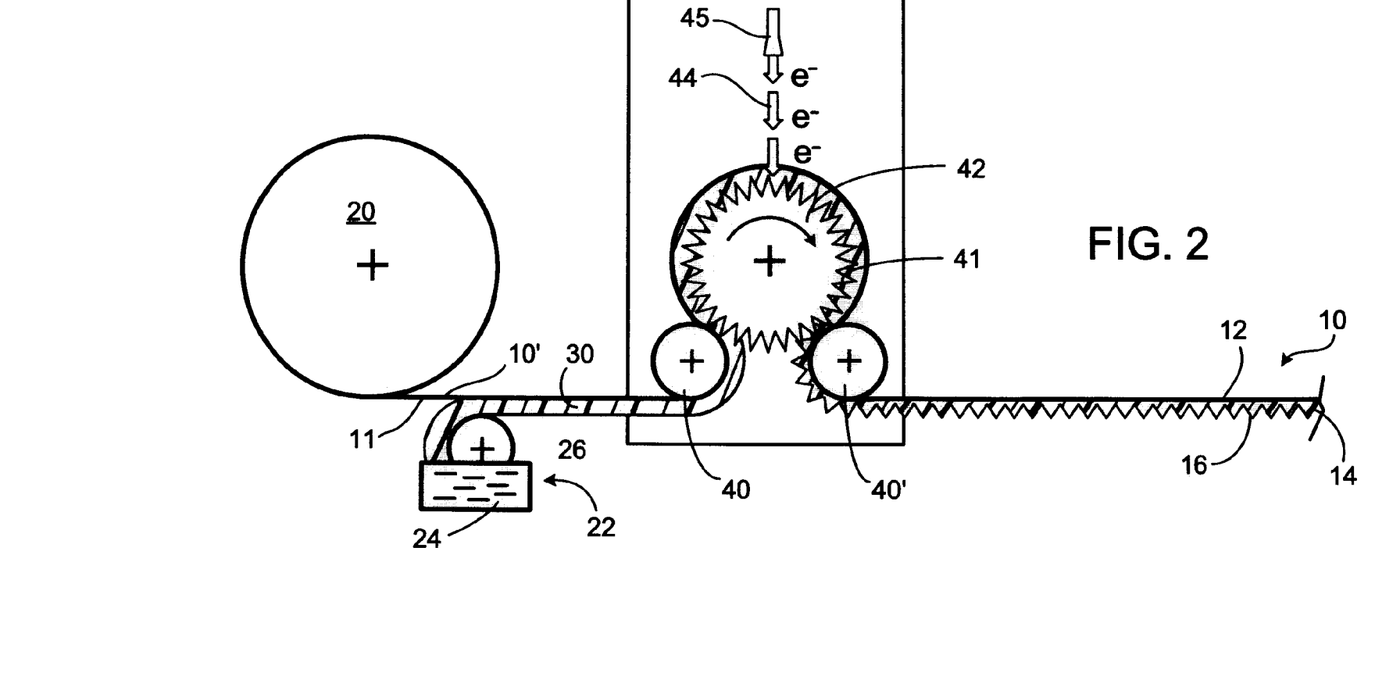
FIG. 2 is schematic cross-sectional view of a process for making the release sheet of FIG. 1.

FIG. 2 illustrates a process for forming the release sheet 10 of FIG. 1 that includes applying a coating of the reaction product M or a formulation that includes the reaction product M to an exterior surface of a substrate and then crosslinking the applied coating. Briefly a substrate 12 such as paper 10' having exterior surface 11 is supplied from a roll 20 and is passed through a coating station 22 that includes a coating roll 26 and a reservoir 24 for holding the reaction product M or the formulation 30. When passing through the coating station 22, the reaction product M or the formulation is applied to the exterior surface 11 of the substrate, and then the coated substrate is pressed against a replication roll 42 having a replicative surface 41 having a desired surface effect. During the pressing, tension is maintained between rolls 40 and 40'. A beam of electrons 44 is supplied from an electron gun 45 with sufficient energy to pass completely through the substrate carrying the reaction product M or the formulation and cure the reaction product M or the formulation that is in contact with roll 42. The release sheet 10 is stripped from the replicative surface 41 and collected, e.g., in a roll at the end of the process (not shown).

In some embodiments, the energy of each electron of the electron beam is from about 80 KeV to about 350 KeV, e.g., from about 90 KeV to about 300 KeV, or from about 125 KeV to about 250 KeV.

In some embodiments, the irradiating is performed until the release sheet has received a dose of at least 0.25 Mrad, e.g., at least 1.0 Mrad, at least 2.5 Mrad, at least 5.0 Mrad, or at least 10.0 Mrad.

In some embodiments, the substrate sufficiently porous such that the coating also extend into the substrate.

In some embodiments, substrate is a cellulosic material such as paper. When paper is used, it can be a coated or an uncoated paper having a weight of, e.g., between about 50 lbs/3300 ft$^2$ and about 300 lbs/3300 ft$^2$, e.g., between about 75 lbs/3300 ft$^2$ and about 250 lbs/3300 ft$^2$, or between about 100 lbs/3300 ft$^2$ and about 200 lbs/3300 ft$^2$. Paper is available from Sappi Fine Paper North America.

Referring also now again to FIG. 1, the crosslinked coating can have a thickness of, e.g., between about 0.001 inch and about 0.020 inch, e.g., between about 0.002 inch and about 0.010 inch or between about 0.002 and about 0.006 inch.

Additional details of processes that can be used to make release sheets are described in Glassock, U.S. Pat. Nos. 6,861,024 and 6,355,343, and Gray et al., U.S. Pat. No. 4,289,821.

Figure 1A:
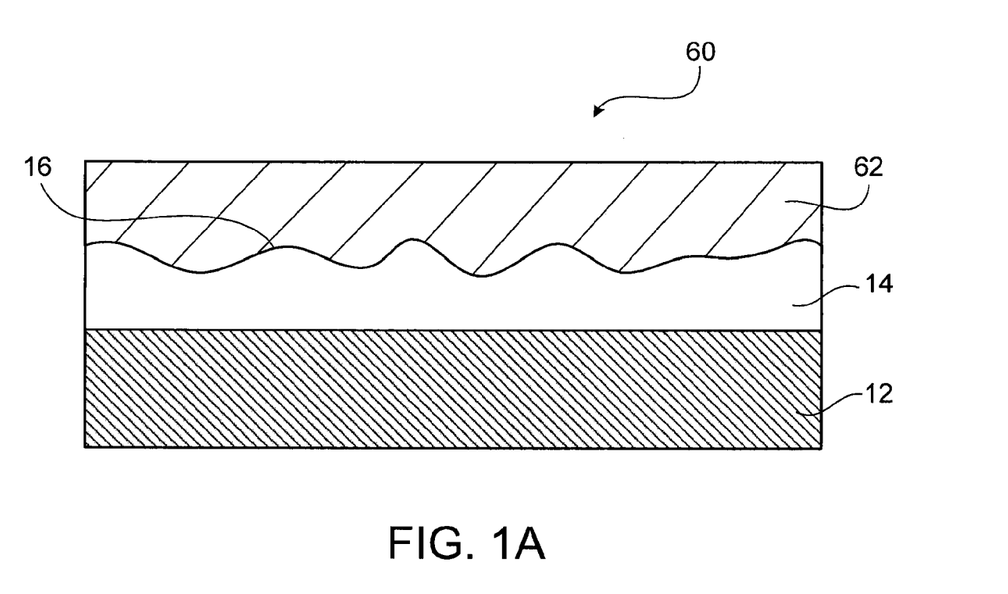
FIG. 1A is a longitudinal cross-sectional view of a portion of a release sheet having a release coating that is integral with a set cast material.
Figure 1B:
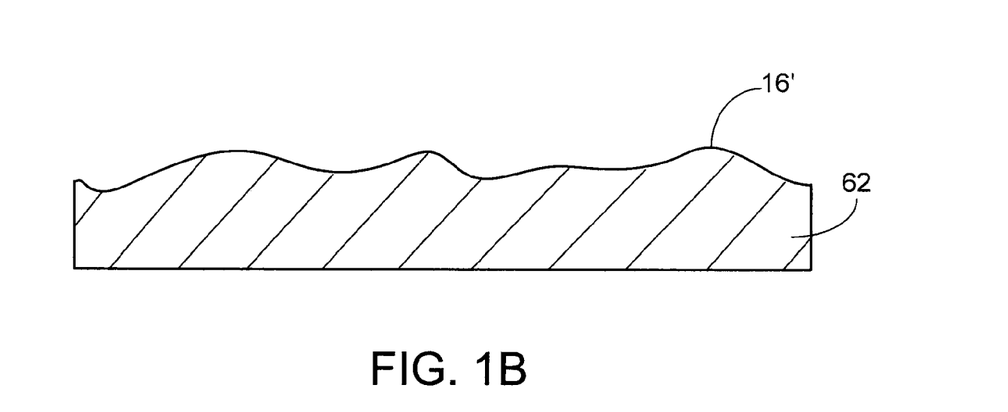
FIG. 1B is a longitudinal cross-sectional view a cast sheet after separation of the cast material from the release sheet.

Referring now to FIGS. 1A and 1B, a product 60 includes any of the release sheets described herein and a cast sheet 62 integral with the coating 14 which extends from substrate 12.

After stripping from the release sheet 10, the cast sheet 62 has a textured replicated surface 16' corresponding to the textured exterior surface 16 of the release sheet 10.

In some embodiments, cast sheet 62 is an artificial leather material that can be used to form articles such as shoes and handbags.

In some embodiments, the reaction product of the acrylic functional material and the Michael donor that forms, at least in part, the coating has a turbidity of less than 250 NTU, e.g., less than 200, less than 150, less than 100, less than 75, less than 50, less than 25 or even less than 5 NTU. Turbidity of the reaction product M is measured according to the procedure set forth above.

In some embodiments, when a solvent-borne polyurethane material, such as SU-21532 of Example 2 (below) is cast upon the coating and set (e.g., its solvent removed or crosslinked), it has a peel resistance (measured as an average of five first releases) from the release sheet of less than 275 g/1.5 in, e.g., less than about 265, less than about 250, less than about 225, less than about 200, less than about 175, less than about 150, less than about 125, less than about 115, less than about 100, less than about 95 or even less than about 90 g/1.5 in. In some embodiments, when a multi-component polyurethane material is used, such as the CM45-based material of Example 2 (below), or the SV353-based material of Example 2 (below) is cast upon the coating and set, it has a peel resistance (measured as an average of five first releases) from the release sheet of less than about 400 g/1.5 in, e.g., less than about 375, less than about 350, less than about 300, less than about 275 or even less than about 225 g/1.5 in. Testing is performed on fully set polyurethane at room temperature by cutting samples which are 1.5 inches wide by 9.5 inches long. The sized samples are tested on an IMASS TL-2200 using a 90 degree stripping angles and a speed of 2828 cm/min.

EXAMPLES

The invention is further described in the following examples, which do not limit the scope of the inventions described in the claims.

Example 1

A. Uncured Release Sheet Coating Formulations

Each of the below formulations were freshly prepared. The control formulation crystallizes after approximately 7-14 days at room temperature. In contrast, no crystallization of either the 092BG formulation or the 092AD formulation is observed after approx 6 months at room temperature.

1. Control Formulation Coating

| Component | Component Weight Percent | Manufacturer |
| --- | --- | --- |
| [1]Pro 5909 | 28.6 | Sartomer Company |
| [2]SR 368 | 27.2 | Sartomer Company |
| [3]SR 351 | 6.8 | Sartomer Company |
| [4]SR 395 | 34.5 | Sartomer Company |
| [5]7295-092BG | None | Ashland Chemical |
| [6]7295-092AD | None | Ashland Chemical |
| [7]2-8577Silicone | 1.9 | Dow Corning |
| [8]Esacure KTO46 | 1.0 | Sartomer Company |

[1]A blend of oligomeric acrylic functional materials
[2]tris-(2-hydroxyethyl) isocyanurate triacrylate
[3]trimethylolpropane triacrylate
[4]isodecyl acrylate
[5]A reaction product of an acrylic functional material that includes tris-(2-hydroxyethyl) isocyanurate triacrylate and a long alkyl tail acetoacetate (available under the tradename Drewrad 200, previously named Flexcure 7295-092BG)
[6]A reaction product of an acrylic functional material that includes tris-(2-hydroxyethyl) isocyanurate triacrylate, and a Michael donor
[7]Dow Corning silicone release fluid
[8]Esacure KTO46 photoinitiator is a blend containing a phosphine oxide, a polymeric material that includes an alpha-hydroxy ketone group and benzophenone derivatives 2. 092BG Formulation Coating

| Component | Component Weight Percent |
| --- | --- |
| Pro 5909 | 28.6 |
| SR 368 | None |
| SR 351 | 6.8 |
| SR 395 | 34.5 |
| 7295-092BG | 27.2 |
| 7295-092AD | None |
| 2-8577 Silicone | 1.9 |
| Esacure KTO 46 | 1.0 |

3. 092AD Formulation Coating

| Component | Component Weight Percent |
| --- | --- |
| Pro 5909 | 28.6 |
| SR 368 | None |
| SR 351 | 6.8 |
| SR 395 | 34.5 |
| 7295-092BG | None |
| 7295-092AD | 27.2 |
| 2-8577 Silicone | 1.9 |
| Esacure KTO 46 | 1.0 |

B. Release Sheets

Each of the above formulations were applied to a Sappi paper having a weight of about 102 lbs/3300 ft². Application of each formulation was achieved using a #16 wire wound rod that applied approximately 20 grams of coating per square meter of paper. Each coating was cured using ultraviolet light. To do so, each coated paper, while blanketed in a nitrogen atmosphere, made one pass under a Fusion UV Systems, Inc. V600 lamp, followed by passage under two Fusion H600 lamps. During the curing, the lamps were operated at 100% power, as each coated paper traversed under the lamps at approximately 65 feet per minute.

Figure 3:
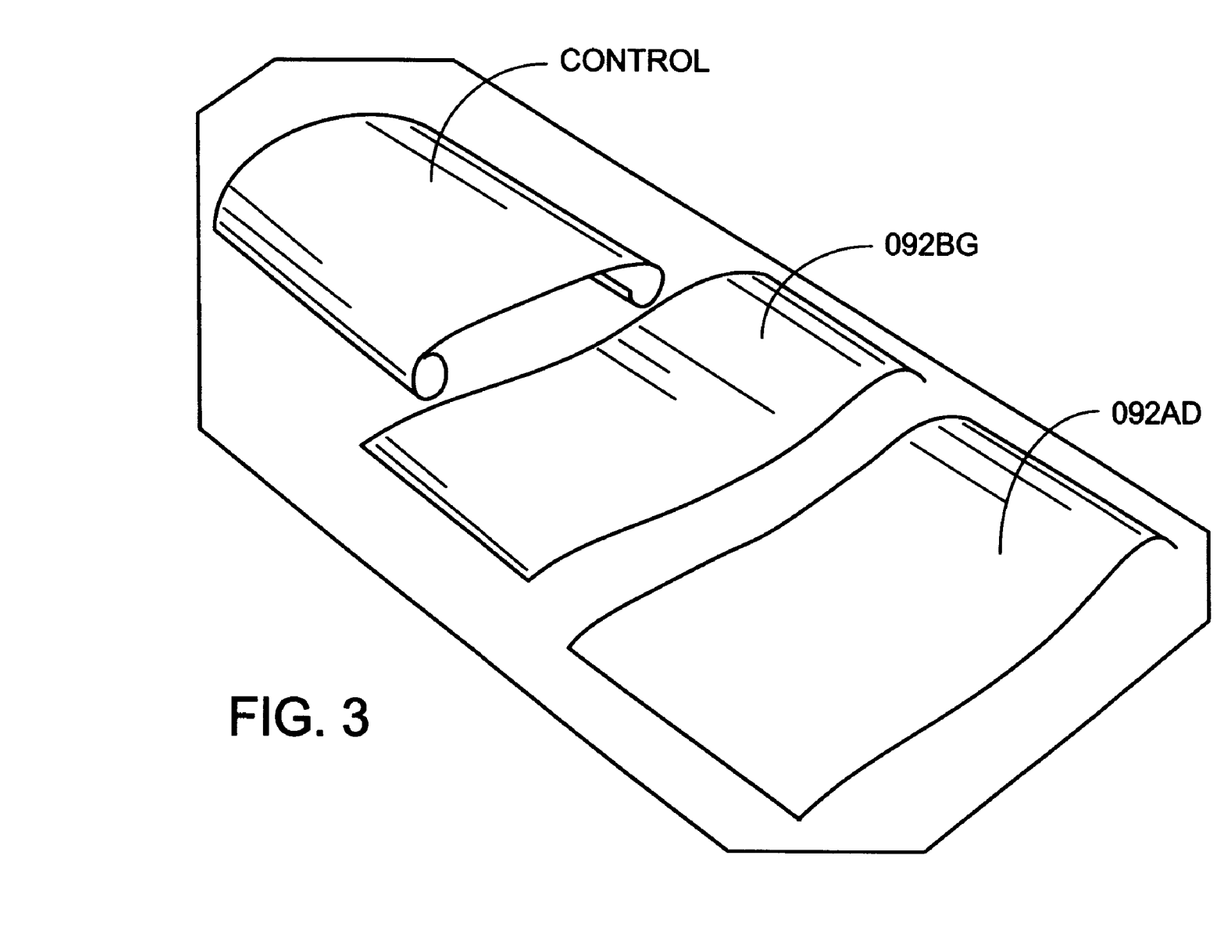
FIG. 3 is a photograph of several different release sheets exhibiting different amounts of curl.

FIG. 3 shows that the release sheet having the control coating exhibited the largest level of curl of the three coatings tested. FIG. 3 also shows that 092BG and 092AD had a similar level of curl, and that both 092BG ad 092AD had a lower level of curl in comparison with the control release sheet.

C. Release of Cast Urethane Coatings from Release Sheets

Each of the above-release sheets was coated with a fully reacted aromatic polyester polyurethane on the release side. The urethane was applied to each release sheet to a thickness of about 0.0015 inch using a Bird-type applicator, and then was partially cured by placing the release sheet having the urethane coating in an oven at 100° C. for 1.5 minutes. Final cure of the urethane was achieved by placing the release sheet having the partially cured urethane coating in an oven at 190° C. for 1.5 minutes. When the release sheets having the urethane coatings were cool, they were cut into samples that are 1.5 inches wide by 9.5 inches long. The sized samples were placed in an IMASS TL-2200 release tester. The cast urethane coating was stripped from the release sheet at 90 degrees and 2828 cm/min. Release force was measured in grams per 1.5 inches. Release data was collected on the first and fourth release.

Figure 4:
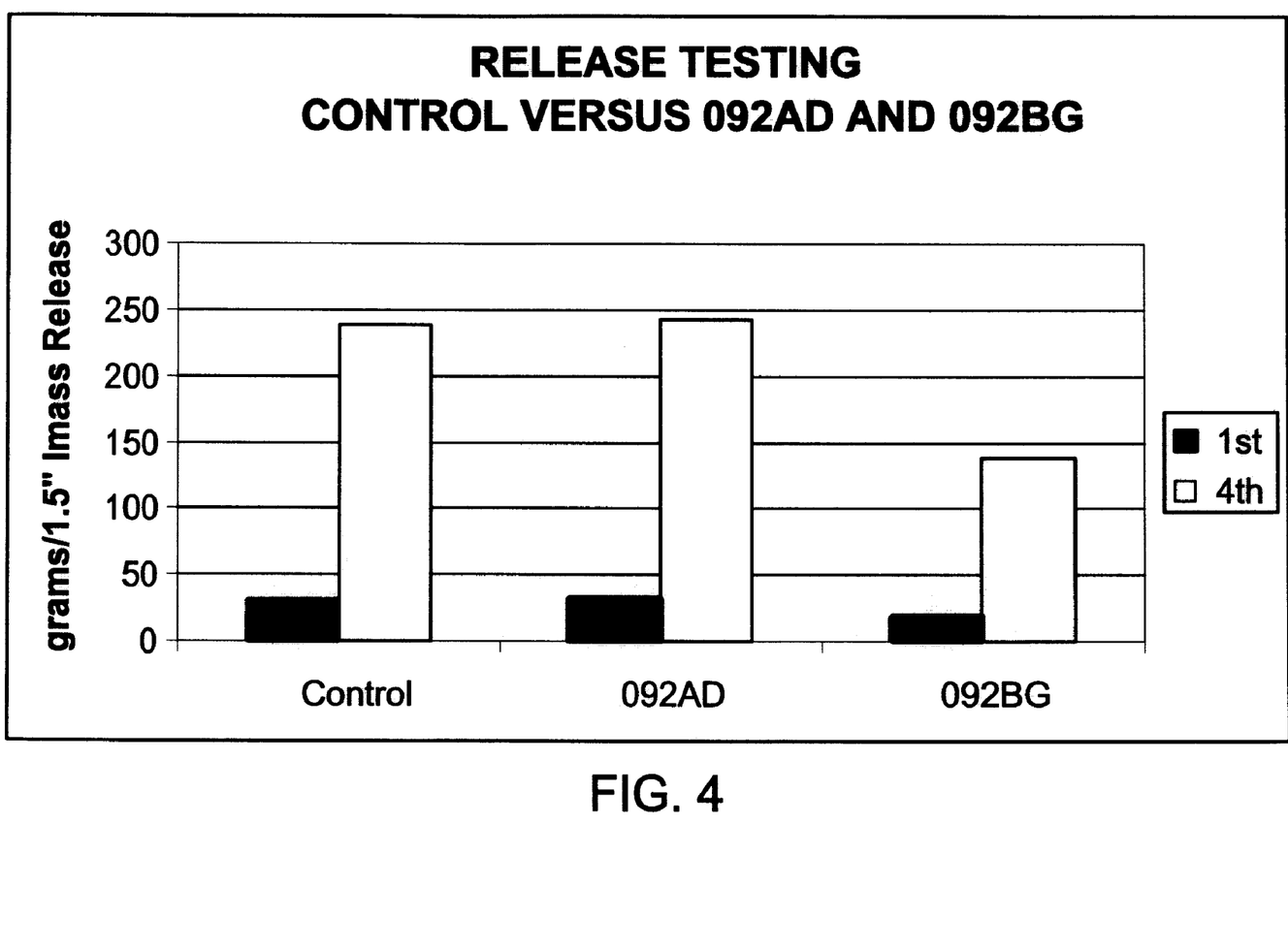
FIG. 4 is a graph showing release data for several release sheet formulations.

FIG. 4 shows stripping data of the urethane coating from each of the above release sheets. The release sheet having the crosslinked control release coating had a release resistance of about 30 grams/1.5 inches on its first release run and about 239 grams/1.5 inches on its fourth. The release sheet having the crosslinked 092AD release coating had a release resistance of about 34 grams/1.5 inches on its first release run and about 243 grams/1.5 inches on its fourth; and the release sheet having the crosslinked 092BG release coating had a release resistance of about 17 grams/1.5 inches on its first release run and about 138 grams/1.5 inches on its fourth. It is believed that the crosslinked 092BG gave the lowest release values because its formulation had an acetoacetate that included a long alkyl tail, which provided a lubricated surface.

Example 2

A. Uncured Release Sheet Coating Formulations

Each of the below formulations were freshly prepared.

1. Control Formulation Coating-2

| Component | Component Weight Percent | Manufacturer |
|---|---|---|
| Pro 5909 | 29.5 | Sartomer Company |
| SR 368 | 28.0 | Sartomer Company |
| SR 351 | 7.0 | Sartomer Company |
| SR 395 | 35.5 | Sartomer Company |
| 7295-092BG | None | Ashland Chemical |
| ⁹NTX-10014 | None | Sartomer Chemical |
| 2-8577 Silicone | None | Dow Corning |
| Esacure KTO 46 | None | Sartomer Company |

[9] A reaction product of an acrylic functional material and a Michael donor available from Sartomer 2. 092BG Formulation Coating-2

| Component | Component Weight Percent |
|---|---|
| Pro 5909 | 29.5 |
| SR 368 | None |
| SR 351 | 7.0 |
| SR 395 | 35.5 |
| 7295-092BG | 28.0 |
| NTX-10014 | None |
| 2-8577 Silicone | None |
| Esacure KTO 46 | None |

3. NTX-10014 Formulation Coating

| Component | Component Weight Percent |
|---|---|
| Pro 5909 | 29.5 |
| SR 368 | None |
| SR 351 | 7.0 |
| SR 395 | 35.5 |
| 7295-092BG | None |
| NTX-10014 | 28.0 |
| 2-8577 Silicone | None |
| Esacure KTO 46 | None |

B. Release Sheets

Each of the above formulations were applied to a Sappi paper having a weight of about 102 lbs/3300 ft². Application of each formulation was performed on an Ultracast coater to provide at a loading of approximately 87 grams of coating per square meter of paper. Each coating was cured with e-beam using 4.0 Mrad radiation, as the web was traversing under the beam at about 120 feet per minute.

C. Release of Cast Urethane Coatings from Release Sheets

Each of the above-release sheets was coated with four polyurethane coatings on their release side. The four coatings were 1) a SU21532-based coating, 2) a ENB01-based coating, 3) a CM45-based coating and 4) a SV353-based coating. The ENB01-based coating is a solvent-borne, fully reacted aromatic polyester polyurethane and the SU21532-based coating is also a solvent-borne urethane casting resin, which is available commercially from Stahl. The CM45-based coating and the SV353-based coating are each multi-component curable urethane resins having formulations described below. Each urethane was applied to each release sheet to a thickness of about 0.0015 inch using a Bird-type applicator, and then was partially cured by placing the release sheet having the urethane coating in an oven at 100° C. for 1.5 minutes. Final cure of the urethane was achieved by placing the release sheet having the partially cured urethane coating in an oven at 190° C. for 1.5 minutes. When the release sheets having the urethane coatings were cool, they were cut into samples that are 1.5 inches wide by 9.5 inches long. The sized samples were placed in an IMASS TL-2200 release tester. The cast urethane coating was stripped from the release sheet at 90 degrees and 2828 cm/min. Release force was measured in grams per 1.5 inches. Release data was collected on the first release.

| RELEASE SHEET FORMU- LATION | PU Coating SU21532 (Release in g/1.5 in) | PU Coating ENB01 (Release in g/1.5 in) | PU Coating CM45 (Release in g/1.5 in) | PU Coating SV353 (Release in g/1.5 in) |
|---|---|---|---|---|
| Control | 116.9 | 357.6 | 466.8 | 402.0 |
| 7295-092BG-2 | 84.0 | 216.2 | 213.2 | 363.8 |
| NTX-10014 | 93.0 | 192.4 | 294.3 | 300.1 |

In addition to the data presented above, each of the new release sheets had a similar level of curl, both having a lower level of curl in comparison with the control release sheet.

D. Polyurethane Formulations

Each of the below formulations were freshly prepared.

1. CM45-Based Coating

| Component | Component Weight Percent | Manufacturer |
|---|---|---|
| Ucecoat CM45 | 94.34 | Cytec Surface Specialties |
| Ucecoat T-376B | 4.72 | Cytec Surface Specialties |
| Ucecoat T-202B | 0.94 | Cytec Surface Specialties |

2. SV353-Based Coating

| Component | Component Weight Percent | Manufacturer |
|---|---|---|
| Ucecoat SV353 | 94.34 | Cytec Surface Specialties |
| Ucecoat IT-131 | 5.66 | Cytec Surface Specialties |

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A product comprising:
a release sheet comprising a substrate and a coating extending from the substrate, the coating comprising a crosslinked polymeric material that is a crosslinked reaction product of an acrylic functional material and a Michael donor; and
a cast sheet integral with the coating.

2. The product of claim 1, wherein the cast sheet is formed of a polyurethane.

3. A product comprising:
a release sheet comprising a substrate and a coating extending from the substrate, the coating comprising a crosslinked polymeric material that is a crosslinked reaction product of an acrylic functional material and a Michael donor, wherein the reaction product of the acrylic functional material and the Michael donor has a turbidity of less than 250 NTU, as measured using ASTM D5180; and
a cast sheet integral with the coating.

4. A release sheet comprising:
a substrate; and
a coating extending from the substrate, the coating comprising a crosslinked polymeric material that is a crosslinked reaction product of an acrylic functional material and a Michael donor,
wherein a solvent-borne polyurethane material cast upon the coating and set has a peel resistance from the release sheet of less than about 275 g/1.5 in.

5. The release sheet of claim 4, wherein the peel resistance is less than 100 g/1.5 in.

6. A product comprising:
a release sheet comprising a substrate and a coating extending from the substrate, the coating comprising a crosslinked polymeric material that is a crosslinked reaction product of an acrylic functional material and a Michael donor, wherein a solvent-borne polyurethane material cast upon the coating and set has a peel resistance from the release sheet of less than 115 g/1.5 in, measured using a solvent-borne polyurethane material; and
a cast sheet integral with the coating.

* * * * *